United States Patent [19]

Mazanek et al.

[11] 4,323,657

[45] Apr. 6, 1982

[54] DISPERSIONS OF HIGH MELTING POLYESTERS IN POLYHYDROXYL COMPOUNDS, A PROCESS FOR THEIR PREPARATION AND THEIR USE IN THE PRODUCTION OF POLYURETHANES

[75] Inventors: Jan Mazanek; Roland Gipp, both of Cologne; Robert Zöllner, Leverkusen; Peter Seifert, Bergisch Gladbach; Küuno Wagner, Leverkusen; Johannes Blahak, Munich, all of Fed. Rep. of Germany

[73] Assignee: Bayer Aktiengesellschaft, Leverkusen, Fed. Rep. of Germany

[21] Appl. No.: 134,367

[22] Filed: Mar. 27, 1980

[30] Foreign Application Priority Data

Apr. 4, 1979 [DE] Fed. Rep. of Germany ....... 2913458

[51] Int. Cl.³ ............................................. C08G 18/14
[52] U.S. Cl. ..................................... 521/116; 252/182; 521/117; 521/118; 521/163; 521/164; 521/166; 521/172; 521/173; 521/174; 521/176; 525/425; 525/432; 525/433; 525/434; 525/439; 525/444; 528/48; 528/52; 528/73; 528/80
[58] Field of Search ................ 252/182; 521/116, 117, 521/118, 163, 164, 166, 172, 173, 174, 176; 528/48, 52, 73, 76, 80, 83; 525/425, 432, 433, 434, 439, 444

[56] References Cited

U.S. PATENT DOCUMENTS

| | | | |
|---|---|---|---|
| 3,110,695 | 11/1963 | Ceresa | 521/155 |
| 3,304,273 | 2/1967 | Stamberger | 521/155 |
| 3,325,421 | 6/1967 | Muller | 252/308 |
| 3,360,495 | 12/1967 | Muller et al. | 260/33.2 |
| 3,383,351 | 5/1968 | Stamberger | 260/33.2 |
| 3,509,079 | 4/1970 | Hyde et al. | 260/2.5 |
| 3,523,093 | 8/1970 | Stamberger | 260/33.2 |
| 3,637,909 | 1/1972 | von Bonin et al. | 521/155 |
| 4,042,537 | 8/1977 | Dahm et al. | 260/33.4 R |
| 4,089,835 | 5/1978 | König et al. | 260/31.6 |
| 4,093,569 | 6/1978 | Reischl et al. | 260/33.4 UR |
| 4,104,236 | 8/1978 | Simroth | 260/33.2 R |
| 4,147,680 | 4/1979 | Reischl et al. | 260/29.2 TN |

FOREIGN PATENT DOCUMENTS

| | | |
|---|---|---|
| 1059682 | 7/1979 | Canada . |
| 2639254 | 3/1978 | Fed. Rep. of Germany . |
| 2654746 | 6/1978 | Fed. Rep. of Germany . |
| 2714291 | 10/1978 | Fed. Rep. of Germany . |
| 2739620 | 3/1979 | Fed. Rep. of Germany . |
| 2740672 | 3/1979 | Fed. Rep. of Germany . |
| 2284638 | 9/1976 | France . |
| 1040452 | 8/1966 | United Kingdom . |
| 1352284 | 5/1974 | United Kingdom . |
| 1493769 | 11/1977 | United Kingdom . |

*Primary Examiner*—Maurice J. Welsh
*Attorney, Agent, or Firm*—Gene Harsh; Joseph C. Gil; Lyndanne M. Whalen

[57] ABSTRACT

Novel, finely divided, redispersible dispersions of high melting polyesters in low melting polyhydroxyl compounds are disclosed. Disclosed also is a process for their preparation and their use as polyol components containing fillers in the production of cellular or noncellular polyurethanes.

13 Claims, No Drawings

DISPERSIONS OF HIGH MELTING POLYESTERS IN POLYHYDROXYL COMPOUNDS, A PROCESS FOR THEIR PREPARATION AND THEIR USE IN THE PRODUCTION OF POLYURETHANES

FIELD OF THE INVENTION

This invention relates to novel, finely divided, redispersible dispersions of high melting polyesters in low melting polyhydroxyl compounds. A process for the preparation of these dispersions and the use of these dispersions as polyol components containing fillers for the production of cellular or non-cellular polyurethanes is also disclosed.

BACKGROUND OF THE INVENTION

The use of relatively high molecular weight polyhydroxyl compounds containing fillers for the production of polyurethanes has become increasingly important in recent years. The possibility of improving the properties of polyurethanes by means of organic or inorganic fillers has led to the development of numerous polyhydroxyl compounds containing such fillers dispersed in a finely divided form. The most important representatives of this class of compounds include dispersions of styrene/acrylonitrile copolymers in relatively high molecular weight polyols (German Auslegeschrift 1,152,536; German Patent 1,769,795 and U.S. Pat. Nos. 3,110,695; 3,304,273; 3,383,351; 3,523,093 and 3,637,909); dispersions of polyisocyanate polyaddition products, in particular polyhydrazodicarbonamides (German Auslegeschriften 1,168,075 (British Pat. No. 1,053,131) and 1,260,142 (U.S. Pat. No. 3,325,421); German Offenlegungsschriften 2,512,385 (U.S. Pat. No. 4,246,160); 2,513,815 (U.S. Pat. No. 4,089,835); 2,550,796 (U.S. Pat. No. 4,093,569); 2,550,797 (U.S. Pat. No. 4,147,680); 2,550,833 (U.S. Pat. No. 4,089,835); 2,550,862 (U.S. Pat. No. 4,089,835); 2,633,293 (U.S. Pat. No. 4,093,569); and 2,639,254 (U.S. Pat. Nos. 4,206,109 and 4,260,530)); dispersions of aminoplast resins (German Offenlegungsschriften Nos. 2,324,134 (U.S. Pat. No. 4,225,481); and 2,423,984 (U.S. Pat. No. 4,042,537)); and dispersions of inorganic compounds such as chalk or barium sulphate in polyhydroxyl compounds (German Offenlegungsschriften Nos. 2,654,746 (U.S. Pat. No. 4,207,227); 2,714,291 (U.S. Pat. No. 4,207,227) and 2,739,620 (U.S. Pat. No. 4,198,333 and 4,250,077).

Dispersions containing organic fillers are generally obtained by the direct preparation of the disperse phase in the polyhydroxyl compound. These dispersions are generally stable for considerable periods, but have the disadvantage of stringent production controls. If the dispersions settle due to some external cause, such as the application of excessively high temperatures, it is generally impossible to redisperse them. This phenomenon is an important cause of product rejection in industrial production.

The dispersions of styrene/acrylonitrile copolymers have the added disadvantage that monomer residues present must be removed quantitatively before the dispersions are used. This is due to toxic properties of these monomers. The main disadvantage of inorganic filler dispersions lies in their generally poor stability during storage.

It has now surprisingly been found that very finely divided, sedimentation resistant, reversibly dispersible organic filler dispersions in polyhydroxyl compounds can easily be obtained by solvent-free dispersion of high melting polyesters in low melting, relatively high molecular weight polyhydroxyl compounds. It is surprising that such dispersions can be prepared without the addition of any emulsifiers. This would not be expected by one skilled in the art since sedimentation resistant dispersions of solids cannot generally be prepared without the aid of emulsifiers. When the known process is employed, filler dispersions which are stable in storage are only obtained if emulsifiers are either added to the system at the same time or formed in situ during preparation of the dispersions in the polyhydroxyl compound.

DESCRIPTION OF THE INVENTION

The present invention relates to dispersions of (a) 1 to 40% by weight, preferably 5 to 25% by weight, based on the whole dispersion, of a polyester, polyester amide or segmented copolyether ester having a melting point above 100° C., preferably in the range of 110° to 220° C. and preferably having an average of 2 to 4 hydroxyl groups which may be partly or completely masked by a reaction with isocyanates or similar compounds, and generally having a molecular weight in the range of 254 to 50,000, in particular 300 to 25,000 as the disperse phase in (b) 99 to 60% by weight, preferably 95 to 75% by weight, based on the whole dispersion, of a polyhydroxyl compound having a melting point below 50° C., preferably below 20° C., in which the dispersed component (a) is substantially insoluble, as the continuous phase, said disperse phase further characterized as containing more than 50% by weight, preferably more than 75% by weight of particles having an average particle size of from 0.05 to 10$\mu$, preferably 0.1 to 4$\mu$, most preferably 0.2 to 2$\mu$.

The invention also relates to a process for the preparation of such dispersions, characterized in that the two components are vigorously mixed with the aid of high shearing forces at a temperature above the melting point of component (a) and the mixture is then cooled below the melting point of component (a) under continued vigorous stirring. Very finely divided dispersions as defined above are formed in this way. Finally, the invention relates to a process for the preparation of cellular or non-cellular polyurethanes by the reaction of (1) polyisocyanates with (2) relatively high molecular weight polyhydroxyl compounds containing organic fillers, (3) optionally, other compounds containing isocyanate reactive groups, (4) optionally in the presence of blowing agents, activators and other known additives, characterized in that the dispersions according to the invention are used as component (2) and that the temperature of the reaction mixture consisting of components (1), (2) and (3) is maintained below the melting point of the organic filler dispersed in component (2).

Processes for the preparation of polyurethanes in which high melting polyesters, copolyether esters or polyester amides may be used in addition to the low melting, relatively high molecular weight polyhydroxyl compounds normally used have already been disclosed in the literature. Examples include those described in German Offenlegungsschrift No. 2,706,297 and British Pat. Nos. 848,837 and 848,980. In this known process, however, the high melting polyol component is chemically built into the polyurethane by carrying out the reaction above the melting point of this component. In contrast to the products produced by the instant invention, therefore, the products obtained by the known art no longer contain the high melting component as a finely divided filler in the hardened polyurethane.

The disperse phase used for the dispersions of the instant invention may be, for example, any polyester polyol having a melting point above 100° C., preferably from 110° to 280° C., most preferably from 120° to 220° C., with molecular weights generally in the range of 254 to 50,000, preferably from 300 to 25,000.

High melting polyesters are generally obtained when either the acid component used for its preparation or the diol component (or portions of both) contain aromatic or cycloaliphatic groups. Examples of such acids include terephthalic acid, isophthalic acid, naphthylene-1,5- and -2,6-dicarboxylic acid and the corresponding dicarboxylic acids which are chlorinated and/or hydrogenated in the nucleus. Examples of suitable aromatic and cycloaliphatic diols include hydantoins such as

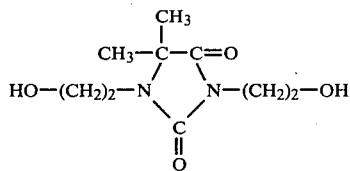

N,N'-bis-(hydroxyalkyl)-benzimidazolones, e.g.

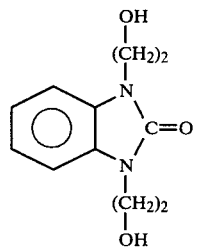

cyclohexanedimethanol, bis-(hyroxymethyl)-hydroquinone, 1,4-phenylene-bis-($\beta$-hydroxyethylether) and the isomeric dihydroxycyclohexanes. The aliphatic polyols and polycarboxylic acids described in detail below may also be used in addition to these cycloaliphatic and aromatic starting components for the preparation of the high melting polyesters. Pivalolactonediol, for example, is a suitable high melting polylactone. According to the invention, however, the high melting dispersed component is preferably a polyester based on terephthalic acid and 1,4-butanediol and/or hexanediol and/or ethylene glycol.

Hydroxyl compounds or carboxylic acids which are monofunctional or more than difunctional may also be used in the preparation of the high melting polyesters of the purpose of regulating their molecular weight or average functionality, although high melting polyesters synthesized from diols and dicarboxylic acids are particularly preferred.

High melting polyester amides suitable for use in the instant invention are obtained by adding amino alcohols, diamines or polyamines in the condensation reaction of carboxylic acids or their anhydrides with polyols.

In addition to the polyesters mentioned above, high melting, segmented copolyether esters in which the molecular structure contains high melting polyester segments linked together by ether or polyether bridges may be used for the preparation of the dispersions of the instant invention. Such copolyether esters may be prepared by known methods, for example by solvent-free condensation of polyalkylene terephthalates with relatively high molecular weight polyesters containing ether groups according to German Offenlegungsschriften Nos. 2,360,287 (U.S. Pat. No. 3,963,800), 2,412,727 and 2,458,472. Another variation consists of condensing a high melting polyester polyol with a polyether polyol in the presence of an etherification catalyst. A suitable process for this has been described, e.g. in German Offenlegungsschrift No. 2,210,839 (U.S. Pat. No. 3,849,515). A high melting polyester polyol based on an aromatic polycarboxylic acid may be prepared in situ in a polyether polyol by a one-shot process in the presence of the usual transesterification catalysts and may then be coupled to the polyether segments by ester interchange, with elimination of glycol by the action of heat (described in the above-identified German Offenlegungsschriften and also in German Offenlegungsschrift No. 2,706,297).

The substances used as the continuous phase of the dispersions in the instant invention may be polyhydroxyl compounds having a molecular weight from 62 to about 12,000, preferably from 400 to 10,000, most preferably from 400 to 6,000, with a melting point below 50° C., preferably below 20° C. These compounds include in particular polyesters, polyethers, polythioethers, polyacetals and polycarbonates having 2 to 8, preferably 2 to 4, most preferably 2 hydroxyl groups such as those known for the preparation of homogeneous and cellular polyurethanes.

The hydroxyl polyesters suitable for this purpose may be, for example, reaction products of polyhydric, preferably dihydric alcohols to which trihydric alcohols may be added and polybasic, preferably dibasic carboxylic acids. Instead of free polycarboxylic acids, the corresponding polycarboxylic acid anhydrides or polycarboxylic acid esters of lower alcohols or mixtures thereof may be used for the preparation of the polyesters. The polycarboxylic acids may be aliphatic, cycloaliphatic, aromatic and/or heterocyclic and they may be substituted, e.g. by halogen atoms, and/or unsaturated.

The following are examples of suitable carboxylic acids and their derivatives: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids which may be mixed with monomeric fatty acids such as oleic acid, dimethyl terephthalate and terephthalic acid-bis-glycol esters. The following are examples of suitable polyhydric alcohols: ethylene glycol, propylene glycol-(1,2) and -(1,3), butylene glycol-(1,4) and -(2,3), hexanediol-(1,6), octanediol-(1,8), neopentyl glycol, 1,4-bis-hydroxymethyl-cyclohexane, 2-methyl-1,3-propanediol, glycerol, trimethylolpropane, hexanetriol-(1,2,6), butanetriol-(1,2,4), trimethylolethane, pentaerythritol, quinitol, mannitol and sorbitol, formitol, methylglycoside, diethylene glycol, triethylene glycol, tetraethylene glycol and higher polyethylene glycols, dipropylene glycol and higher polypropylene glycols, dibutylene glycol and higher polybutylene glycols. The polyesters may also contain a proportion of carboxyl end groups. Polyesters of lactones such as ε-caprolactone or hydroxycarboxylic acids such as ω-hydroxycaproic acid may also be used.

The polyethers used in the instant invention which have at least 2, generally 2 to 8 and preferably 2 to 3, hydroxyl groups are also known per se and are prepared, for example, by polymerization of epoxides such as ethylene oxide, propylene oxide, butylene oxide, tetrahydrofuran, styrene oxide or epichlorohydrin, either each on its own, e.g. in the presence of Lewis catalysts, such as BF$_3$, borontrifluoride, or by addition of these epoxides, preferably ethylene oxide and propylene oxide, either as mixtures or successively, to starting components having reactive hydrogen atoms, such as water, alcohols, ammonia or amines, e.g. ethylene glycol, propylene glycol-(1,3) or -(1,2), trimethylolpropane, glycerol, sorbitol, 4,4'-dihydroxydiphenylpropane, aniline, ethanolamine or ethylene diamine. Sucrose polyethers may also be used in the present invention, e.g. those described in German Auslegeschriften Nos. 1,176,358 and 1,064,938, and polyethers started on formitol or formose (German Offenlegungsschriften Nos. 2,639,083 and 2,737,951). It is often preferred to use polyethers which contain predominantly primary hydroxyl groups (up to 90% by weight, based on all the hydroxyl groups present in the polyether). Polybutadienes with hydroxyl groups are also suitable for the invention.

Preferred among the polythioethers are the condensation products obtained by reacting thiodiglycol on its own and/or with other glycols, dicarboxylic acids, formaldehyde, aminocarboxylic acids or amino alcohols. The products obtained are polythio- mixed ethers, polythio- ether esters are polythio- ether ester amides, depending on the co-components.

Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for use in the instant invention may also be prepared by the polymerization of cyclic acetals, e.g. trioxane (German Offenlegungsschrift 1,694,128).

Known polycarbonates with hydroxyl groups may be used, for example, those which can be prepared by the reaction of diols such as propanediol-(1,3), butanediol-(1,4) and/or hexanediol-(1,6), diethylene glycol, triethylene glycol, tetraethylene glycol or thiodiglycol with diarylcarbonates, e.g. with diphenylcarbonate or phosgene (German Auslegeschriften Nos. 1,694,080; 1,915,908 and 2,221,751; German Offenlegungsschrift No. 2,605,024).

Polyhydroxyl compounds already containing urethane or urea groups and modified or unmodified natural polyols, such as castor oil, may also be used. Addition products of alkylene oxides and phenol formaldehyde resins or of alkylene oxides and urea formaldehyde resins are also suitable for the purpose of the invention.

Polyols containing conventional organic and/or inorganic fillers may also be used as the continuous phase in the instant invention, although they are less preferred. Such modified polyhydroxyl compounds may be obtained in known manner, for example, by carrying out the polyaddition reaction (e.g. reactions between poly-isocyanates and aminofunctional compounds) or polycondensation reactions (e.g. between formaldehyde and phenols and/or amines) in situ in the above-mentioned hydroxyl compounds. These processes have been described, for example, in German Auslegeschriften Nos. 1,168,075 and 1,260,142 and German Offenlegungsschriften Nos. 2,324,134; 2,423,984; 2,512,385; 2,513,815; 2,550,796, 2,550,797; 2,550,833; 2,550,862; 2,633,293 and 2,639,254. These substances may also be obtained by following U.S. Pat. No. 3,869,413 or German Offenlegungsschrift No. 2,550,860, i.e., mixing a previously prepared aqueous polymer dispersion with a polyhydroxyl compound and then removing the water from the mixture.

Polyhydroxyl compounds modified with vinyl polymers are suitable for the instant process. These may be obtained, for example, by the polymerization of styrene and acrylonitrile in the presence of polyethers (U.S. Pat. Nos. 3,383,351; 3,304,273; 3,523,093 and 3,110,695 and German Auslegeschrift No. 1,152,536) or polycarbonate polyols (German Pat. No. 1,769,795, U.S. Pat. No. 3,637,909). When using polyether polyols which have been modified according to German Offenlegungsschriften Nos. 2,442,101; 2,644,922 and 2,646,141 by graft polymerization with vinyl phosphonic acid esters and, optionally, (meth)acrylonitrile, (meth)acrylamide or OH functional (meth)acrylic acid esters, polymeric products with exceptionally high flame resistance are obtained. Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620 and 2,654,746) are particularly advantageously used in combination with mineral fillers.

Representatives of the above-mentioned compounds which may be used according to the invention have been described, for example, in High Polymers, Volume XVI, "Polyurethanes, Chemistry and Technology" by Saunders-Frisch, Interscience Publishers, New York, London, Part I, 1962, pages 32–42 and pages 44–54 and Part II, 1964, pages 5–6 and 198–199 and in Kunststoff-Handbuch, Volume VII, Vieweg-Höchtlen, Carl-Hanser-Verlag, Munich, 1966, e.g. on pages 45–71. Mixtures of the above-mentioned compounds containing at least two isocyanate reactive hydrogen atoms and having a molecular weight in the range of 400 to 10,000 may, of course, also be used, e.g. mixtures of such polyethers and polyesters.

When choosing the starting compounds for all of these polymers which are suitable for use as the continuous phase of the dispersion in the instant process, care must be taken to ensure that the polyol has the above-mentioned low melting point.

Polyols with molecular weights from 62 to 400 may also be used as the continuous phase of the dispersions in the instant invention. Mixtures of different compounds each having at least two hydroxyl groups or mixtures of low molecular weight compounds with the above-mentioned higher molecular weight polyols may also be used. The following are examples of suitable low molecular weight compounds: ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethylcyclohexane, 2-methyl-1,3-propanediol, dibromobutenediol (U.S. Pat. No. 3,723,392), glycerol, trimethylolpropane, hexanetriol-(1,2,6), trimethylolethane, pentaerythritol, castor oil, diethylene glycol, triethylene glycol, tetraethylene glycol, higher polyethylene glycols with molecular weights up to 400, dipropylene glycol, higher polypropylene glycols with molecular weights up to 400, dibutylene glycol, higher polybutylene glycols with molecular weights up to 400, diethanolamine, N-methyl diethanolamine and triethanolamine.

The low molecular weight polyols used in the instant invention may also be mixtures of hydroxyaldehydes and hydroxyketones ("formoses") or the polyhydric alcohols ("formitol") obtained from them by reduction, for example, the compounds resulting from the autocondensation of formaldehyde hydrate in the presence of metal compounds as catalysts and compounds capable of enediol formation as co-catalysts (German Offenlegungsschriften Nos. 2,639,084; 2,714,084; 2,714,104; 2,721,186; 2,738,154 and 2,738,512). For obtaining polymer products with improved flame resistance, these formoses are advantageously used in combination with aminoplast formers and/or phosphites (German Offenlegungsschriften Nos. 2,738,513 and 2,738,532). Solutions of polyisocyanate polyaddition products, in particular of polyurethane ureas containing ionic groups and/or polyhydrazodicarbonamides, in low molecular weight polyhydric alcohols may also be used as polyol components in the instant invention (German Offenlegungsschrift No. 2,638,759).

The dispersions of the instant invention are preferably prepared by the solvent-free dispersion process. For the batchwise preparation of these dispersions, it is particularly suitable to use a variation of the process in which the high melting component and the low melting polyol are melted together and vigorously mixed under the action of powerful shearing forces. The entire batch is then subsequently cooled with continued vigorous stirring or the thoroughly stirred mixture is passed through a cooled chamber equipped with an efficient stirrer. The last mentioned variation constitutes a transition from the batchwise to the continuous method. Alternatively, the high melting component and the low melting component may be continuously introduced into one section of a heated reactor and vigorously mixed there and the mixture may then be continuously removed from a second section of the reactor and subsequently cooled with vigorous stirring as described above.

Continuous preparation of the dispersions in the instant invention may also be carried out by directly introducing the molten high melting component into a cold or preheated stream of the low melting component with vigorous stirring, e.g. using a porcupine stirrer and then cooling the mixture. The optimum operating conditions for a given combination of starting components can quickly be determined by one skilled in the art by varying the rate of dosing and cooling and the dwell time of the mixture in the mixing and cooling chambers.

Less preferred for the preparation of the dispersion of the instant invention is the solvent process. In this process, the high melting component which is required to be dispersed is first dissolved in a solvent. The solution obtained is then vigorously mixed with the low melting polyhydroxyl compound (optionally portionwise) which may also be in the form of a solution. At the same time or subsequently, the one or two solvents is or are distilled with vigorous stirring, optionally under vacuum. This process may also be carried out either continuously or batchwise. The solvent process is particularly recommended in cases where the high melting component has such a high melting point that thermal decomposition of one of the components may be expected if the solvent-free dispersion process is employed. Suitable solvents include e.g. dioxane DMF and acetonitrile.

It is possible, but not necessary, to add known dispersing agents or emulsifiers to the dispersions of the instant invention during their preparation. It is, however, a particular feature of the present invention, as already mentioned above, that the dispersions of the instant invention are sufficiently stable without the addition of such auxiliary agents.

The dispersions of the instant invention are valuable starting materials for the production of polyurethane products, particularly polyurethane foams. Their main advantage lies in a substantial increase in the compression resistance and heat distortion temperature of the foams. For the production of polyurethanes, it is preferrd in the instant invention to use dispersions in which the dispersed component (preferably a polyalkylene terephthalate) still contains free hydroxyl groups so that the particles of filler are partly chemically attached to the polyurethane matrix as a result of a reaction of the free hydroxyl groups on their surface in the polyisocyanate polyaddition process. It is possible, in principle, to use dispersions in which the free hydroxyl groups of the high melting dispersed component have undergone reaction, e.g. with monocarboxylic acids, monoisocyanates or similar compounds, optionally only on the surface of the particles.

The isocyanate components used in the preparation of polyurethanes in the instant invention are taken from the known aliphatic, cycloaliphatic, araliphatic, aromatic and heterocyclic polyisocyanates, e.g. those described by W. Siefken in Justus Liebigs Annalen der Chemie, 562, pages 75 to 136. For example, those isocyanates corresponding to the following formula:

$$Q(NCO)_n$$

in which n=2 to 4, preferably B 2, and

Q represents an aliphatic hydrocarbon group having 2 to 18, preferably 6 to 10 carbon atoms, a cycloaliphatic hydrocarbon group having 4 to 15, preferably 5 to 10 carbon atoms, an aromatic hydrocarbon group having 6 to 15, preferably 6 to 13 carbon atoms or an araliphatic hydrocarbon group having 8 to 15, preferably 8 to 13 carbon atoms.

Specific examples are ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any mixtures of these isomers. Further examples are 1-isocyanato-3,3,5-trimethyl-5-isocyanatomethyl-cyclohexane (German Auslegeschrift No. 1,202,785, U.S. Pat. No. 3,401,190), 2,4- and 2,6-hexahydrotolylene diisocyanate and any mixtures of these isomers, hexahydro-1,3- and/or 1,4-phenylene diisocyanate, perhydro-2,4'- and/or 4,4'-diphenylmethane diisocyanate, 1,3- and 1,4-phenylene diisocyanate, 2,4- and 2,6-tolylene diisocyanate and any mixtures of these isomers, along with diphenylmethane-2,4'- and/or 4,4'-diisocyanate and naphthylene-1,5-diisocyanate.

The isocyanate components which may be used in the instant invention are also exemplified by the following compounds: triphenylmethane-4,4',4''-triisocyanate, polyphenyl-polymethylene polyisocyanates which may be obtained by aniline-formaldehyde condensation followed by phosgenation and have been described e.g. in British Patents Nos. 874,430 and 848,671. Also suitable are m- and p-isocyanatophenylsulphonyl isocyanates according to U.S. Pat. No. 3,454,606 and perchlorinated aryl polyisocyanates as described e.g. in German Auslegeschrift No. 1,157,601 (U.S. Pat. No. 3,277,138) as well as polyisocyanates having carbodiimide groups as described in German Patent No. 1,092,007 (U.S. Pat. No. 3,152,162) and in German Offenlegungsschriften Nos. 2,504,400; 2,537,685 and 2,552,350. Norbornane diisocyanates according to U.S. Pat. No. 3,492,330, polyisocyanates with allophanate groups as described e.g. in British Patent No. 994,890, Belgian Patent No. 761,626 and Dutch Patent Application No. 7,102,524 are also suitable. Polyisocyanates with isocyanurate groups as described e.g. in U.S. Pat. No. 3,001,973, German Patents Nos. 1,022,789; 1,222,067 and 1,027,394 and German Offenlegungsschriften Nos. 1,929,034 and 2,004,048 and polyisocyanates with urethane groups such as those described e.g. in Belgian Patent No. 752,261 or in U.S. Pat. Nos. 3,394,164 and 3,644,457 as well as polyisocyanates with acylated urea groups according to German Patent No. 1,230,778 are suitable. Polyisocyanates with biuret groups as described e.g. in U.S. Pat. Nos. 3,124,605 and 3,201,372 and British Patent No. 889,050 may also be used in the instant invention. Polyisocyanates prepared by telomerization reactions as described in U.S. Pat. No. 3,654,106 and polyisocyanates with ester groups such as those mentioned in British Patents Nos. 965,474 and 1,072,956, U.S. Pat. No. 3,567,763 and German Patent No. 1,231,688 as well as reaction products of the above-mentioned isocyanates with acetals according to German Patent No. 1,072,385 and polyisocyanates containing polymeric fatty acid esters according to U.S. Pat. No. 3,455,883 are still more examples of suitable compounds.

The distillation residues obtained from the commercial production of isocyanates and still containing isocyanate groups may also be used, optionally dissolved in one or more of the above-mentioned polyisocyanates. Any mixtures of the above-mentioned polyisocyanates may also be used.

It is particularly preferred to use commercially readily available polyisocyanates such as 2,4- and 2,6-tolylene diisocyanate and any mixtures of these isomers ("TDI"); polyphenyl-polymethylene polyisocyanates which may be prepared by aniline-formaldehyde condensation followed by phosgenation ("crude MDI") and polyisocyanates containing carbodiimide groups, urethane groups, allophanate groups, isocyanurate groups, urea groups or biuret groups ("modified polyisocyanates"). Particularly those modified polyisocyanates which are derived from 2,4- and/or 2,6-tolylene diisocyanate or from 4,4'- and/or 2,4'-diphenylmethane diisocyanate may be used.

Additionally, other known compounds containing isocyanate reactive groups may be used in the preparation of polyurethanes. Examples are the low molecular weight and relatively high molecular weight polyhydroxyl compounds already described above but particularly aliphatic or aromatic diamines used as chain lengthening agents.

Aliphatic diamines which are suitable for the instant invention include, for example, ethylene diamine: 1,4-tetramethylenediamine; 1,11-undecamethylenediamine, 1,12-dodecamethylenediamine and mixtures thereof.

Also suitable are 1-amino-3,3,5-trimethyl-5-aminomethylcyclohexane ("isophorone diamine"), 2,4- and 2,6-hexahydrotolylenediamine and mixtures thereof. Perhydro-2,4'- and 4,4'-diaminodiphenylmethane; p-xylylene diamine, bis-(3-aminopropyl)-methylamine, diaminoperhydroanthracene (German Offenlegungsschrift 2,638,731) and cycloaliphatic triamines according to German Offenlegungsschrift 2,614,244 are further examples of suitable compounds. Hydrazine and substituted hydrazines such as methyl hydrazine and N,N'-dimethylhydrazine and their homologues may also be used in the instant invention. Acid hydrazides are also suitable, e.g. carbodihydrazide, oxalic acid dihydrazide, the dihydrazides of malonic acid, succinic acid, glutaric acid, adipic acid, β-methyladipic acid, sebacic acid, hydracrylic acid and terephthalic acid. Also suitable are semicarbazidoalkylene hydrazides, e.g. β-semicarbazidopropionic acid hydrazide (German Offenlegungsschrift No. 1,770,591). Semicarbazidoalkylene carbazic esters, e.g. 2-semicarbazidoethylcarbazic ester (German Offenlegungsschrift No. 1,918,504) and also aminosemicarbazide compounds, e.g. β-aminoethylsemicarbazidocarbonate (German Offenlegungsschrift No. 1,902,931) are still further examples. The amino groups may be partly or completely blocked by aldimine or ketimine groups to control their reactivity (U.S. Pat. No. 3,734,894, German Offenlegungsschrift No. 2,637,115).

Examples of aromatic diamines include bisanthranilic acid esters according to German Offenlegungsschriften Nos. 2,040,644 and 2,160,590; 3,5- and 2,4-diaminobenzoic acid esters according to German Offenlegungsschrift No. 2,025,900. The diamines with ester groups described in German Offenlegungsschriften Nos. 1,803,635 (U.S. Pat. Nos. 3,681,290 and 3,736,350), 2,040,650 and 2,160,589 as well as the diamines with ether groups according to German Offenlegungsschriften Nos. 1,770,525 and 1,809,172 (U.S. Pat. Nos. 3,654,364 and 3,736,295) and 2-halogen-1,3-phenylene diamines which may be substituted in the 5-position (German Offenlegungsschriften Nos. 2,001,772; 2,025,896 and 2,065,869) are further examples. 3,3'-dichloro-4,4'-diaminodiphenylmethane; tolylene diamine; 4,4'-diaminodiphenylmethane; 4,4'-diaminodiphenyldisulphides (German Offenlegungsschrift No. 2,404,976); diaminodiphenyldithioether (German Offenlegungsschrift No. 2,509,404) are also suitable aromatic diamines. Aromatic diamines substituted with alkylthio groups (German Offenlegungsschrift No. 2,638,760); diaminobenzene phosphonic acid esters (German Offenlegungsschrift No. 2,459,491); aromatic diamines containing sulphonate or carboxylate groups (German Offenlegungsschrift No. 2,720,166) and the high melting diamines mentioned in German Offenlegungsschrift No. 2,635,400 are still further examples of suitable diamines. The aminoalkylthioanilines according to German Offenlegungsschrift No. 2,734,574 are examples of aliphatic-aromatic diamines.

Compounds such as 1-mercapto-3-aminopropane, substituted or unsubstituted aminoacids such as glycine, alanine, valine, serine and lysine and substituted or unsubstituted dicarboxylic acids such as succinic acid, adipic acid, phthalic acid, 4-hydroxyphthalic acid and 4-aminophthalic acid may also be used as chain lengthening agents in the instant invention.

Compounds which are monofunctional in their reaction with isocyanate may also be added as so-called chain breakers in proportions of 0.01 to 10% by weight, based on the polyurethane solids content. Examples of such monofunctional compounds include monoamines such as butylamine and dibutylamine, octylamine, stearylamine, N-methylstearylamine, pyrrolidine, piperidine and cyclohexylamine, monohydric alcohols such as butanol, 2-ethylhexanol, octanol and dodecanol and the various amyl alcohols, cyclohexanol and ethylene glycol monoethyl ether.

The following are examples of auxiliary agents and additives which may be used in the instant invention for the preparation of polyurethanes: water and/or readily volatile inorganic or organic substances as blowing agents. Examples of suitable organic blowing agents include acetone, ethyl acetate, halogenated alkanes such as methylene chloride, chloroform, ethylidene chloride, vinylidene chloride, monofluorotrichloromethane, chlorodifluoromethane, dichlorodifluoromethane, butane, hexane, heptane and diethyl ether. Examples of suitable inorganic blowing agents include air, carbon dioxide and nitrous oxide. A blowing agent effect may also be obtained by the addition of compounds which decompose at elevated temperatures to release gases, for example nitrogen. Examples of such compounds include azo compounds. Examples of these azo compounds are azodicarbonamide and azoisobutyric acid nitrile. Further examples of blowing agents and details concerning the use of blowing agents may be found in Kunststoff-Handbuch, Volume VII, published by Vieweg-Höchtlen, Carl-Hanser-Verlag, Munich, 1966, e.g. on pages 108 and 109, 453–455 and 507–510.

Known catalysts, for example, tertiary amines such as triethylamine, tributylamine, N-methylmorpholine, N-ethylmorpholine, N,N,N',N'-tetramethyl-ethylenediamine, pentamethyl-diethylenetriamine and higher homologues (German Offenlegungsschriften Nos. 2,624,527 and 2,624,528) may also be used with the instant invention. Further examples of catalysts are 1,4-diazabicyclo-(2,2,2)-octane, N-methyl-N'-dimethylaminoethylpiperazine, bis-(dimethylaminoalkyl)-piperazines (German Offenlegungsschrift No. 2,636,787), N,N-dimethylbenzylamine, N,N-dimethylcyclohexylamine, N,N-diethylbenzylamine, bis-(N,N-diethylaminoethyl)adipate, N,N,N',N'-tetramethyl-1,3-butanediamine, N,N-dimethyl-β-phenylethylamine, 1,2-dimethylimidazole, 2-methylimidazole, monocyclic and bicyclic amidines (German Offenlegungsschrift No. 1,720,633). Bis-(dialkylamino)alkyl ethers (U.S. Pat. No. 3,330,782, German Auslegeschrift No. 1,030,558, German Offenlegungsschriften Nos. 1,804,361 and 2,618,280) and tertiary amines containing amide groups, preferably formamide groups, according to German Offenlegungsschriften Nos. 2,523,633 and 2,732,292 are also examples of suitable catalysts. The known Mannich bases obtained from secondary amines such as dimethylamine and aldehydes, preferably formaldehyde, or ketones such as acetone, methyl ethyl ketone or cyclohexanone and phenols such as phenol, nonyl phenol or bis-phenol may also be used as catalysts.

Examples of tertiary amines with isocyanate reactive hydrogen atoms which may be used as catalysts are triethanolamine, triisopropanolamine, N-methyldiethanolamine, N-ethyl-diethanolamine, N,N-dimethylethanolamine. Their reaction products with alkylene oxides such as propylene oxide and/or ethylene oxide and secondary tertiary amines according to German Offenlegungsschrift No. 2,732,292 are also suitable.

Silaamines having carbon-silicon bonds as described e.g. in German Patent No. 1,229,290, corresponding to U.S. Pat. No. 3,620,984, may also be used as catalyst, e.g. 2,2,4-trimethyl-2-silamorpholine and 1,3-diethylaminomethyl-tetramethyl-disiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts (German Offenlegungsschrift No. 1,769,043).

The reaction between isocyanate groups and Zerewitinoff-active hydrogen atoms is also powerfully accelerated by lactams and azalactams, an associate being first formed between the lactam and the compound which has the acidic hydrogen atom. Such associates and their catalytic action have been described in German Offenlegungsschriften Nos. 2,062,288; 2,062,289; 2,117,576 (U.S. Pat. No. 3,758,444); 2,129,198; 2,330,175 and 2,330,211.

Organometallic compounds, in particular organic tin compounds, may also be used as catalysts in the present invention. The organic tin compounds used may also contain sulphur, for example, di-n-octyl-tin mercaptide (German Auslegeschrift No. 1,769,367, U.S. Pat. No. 3,645,927). Preferable organometallic compounds are tin(II) salts of carboxylic acids such as tin(II) acetate, tin(II) octoate, tin(II) ethyl hexoate and tin(II) laurate and the tin(IV) compounds such as dibutyl tin oxide, dibutyl tin dichloride, dibutyl tin diacetate, dibutyl tin dilaurate, dibutyl tin maleate or dioctyl tin diacetate.

Any of the above-mentioned catalysts may, of course, also be used as mixtures. Combinations of organic metal compounds with amidines, aminopyridines or hydrazino-pyridines are particularly interesting (German Offenlegungsschriften Nos. 2,434,185; 2,601,082 and 2,603,834).

Other representative catalysts which may be used in the instant invention and details concerning the activity of these catalysts may be found in Kunststoff-Handbuch, Volume VII, published by Vieweg-Höchtlen, Carl-Hanser-Verlag, Munich, 1966, e.g. on pages 96 to 102.

The catalysts are generally used in a quantity of from 0.001 to 10% by weight, based on the total quantity of compounds containing at least two isocyanate reactive hydrogen atoms.

Surface active additives such as emulsifiers and foam stabilizers may also be used with the instant invention. The emulsifiers may be, for example, the sodium salts of castor oil sulphonates or salts of fatty acids with amines, such as oleic acid diethylamine or stearic acid diethanolamine. Alkali metal or ammonium salts of sulphonic acids such as dodecylbenzene sulphonic acid or dinaphthylmethane disulphonic acid or of fatty acids such as ricinoleic acid or of polymeric fatty acids may also be used as surface active additives.

The foam stabilizers used are mainly polyether siloxanes, especially those which are water-soluble. These compounds generally have a polydimethylsiloxane group attached to a copolymer of ethylene oxide and propylene oxide. Foam stabilizers of this type have been described, e.g. in U.S. Pat. Nos. 2,834,748; 2,917,480 and 3,629,308. Polysiloxane-polyoxyalkylene copolymers branched via allophanate groups according to German Offenlegungsschrift No. 2,558,523 are of particular interest.

Reaction retarders, e.g. compounds which are acid in reaction such as hydrochloric acid or organic acid halides, known cell regulators such as paraffins or fatty alcohols or dimethylpolysiloxane, pigments, dyes and known flame retarding agents such as tris-(chloroethyl)-phosphate, tricresylphosphate and ammonium phosphate and polyphosphate, stabilizers against ageing and weathering, plasticizers, fungistatic and bacteriostatic substances and fillers such as barium sulphate, kieselguhr, carbon black or whiting can also be used in the instant invention.

Further examples of additives which may be used in the instant invention, such as surface active additives, foam stabilizers, cell regulators, reaction retarders, stabilizers, flame retarding substances, plasticizers, dyes and fillers and fungistatic and bacteriostatic substances and details concerning the use and mode of action of these additives are described in Kunststoff-Handbuch, Volume VII, published by Vieweg-Höchtlen, Carl-Hanser-Verlag, Munich, 1966, e.g. on pages 103 to 113.

Method of carrying out the process according to the invention:

In the instant invention, the starting components are reacted together by the known one-shot process, prepolymer process or semiprepolymer process, in many cases using mechanical devices such as those described in U.S. Pat. No. 2,764,565. Details concerning processing apparatus which may be used in the instant invention may be found in Kunststoff-Handbuch, Volume VII, published by Vieweg-Höchtlen, Carl-Hanser-Verlag, Munich, 1966, e.g. on pages 121 to 205.

Production of the foams may be carried out inside closed molds, in which case, the reaction mixture is introduced into a mold which may be made of a metal such as aluminum or a synthetic material such as an epoxide resin. The reaction mixture foams up inside the mold to form the molded article. This process of foaming in a mold may be carried out to produce an article having a cellular structure on its surface or it may be carried out in such a manner that the article has a non-cellular skin and a cellular core. The desired result may be achieved by, in one case, introducing just sufficient foamable reaction mixture into the mold to completely fill the mold with foam or, in the other case, introducing a larger quantity of reaction mixture than is necessary for filling the interior of the mold with foam. The latter procedure is known as "overcharging", which has already been disclosed, e.g. in U.S. Pat. Nos. 3,178,490 and 3,182,104.

So-called "external mold release agents" such as silicone oils are frequently used when foaming inside molds but so-called "internal mold release agents" may also be used. These "internal mold release agents" may be used, optionally, in combination with external mold release agents, e.g. as disclosed in German Offenlegungsschriften Nos. 2,121,670 and 2,307,589.

Cold setting foams may also be produced by the instant invention (see British Patent No. 1,162,517, German Offenlegungsschrift No. 2,153,086).

Foams may, of course, also be produced by block foaming or by the known laminator process.

One essential feature of the instant invention is that the reaction temperature during the polyisocyanate polyaddition reaction should lie below the melting point of the high melting component contained in the dispersion of the instant invention (preferably above 10° C.). This is so that the high melting component will not be completely built into the polyurethane molecule but instead will exist as particles of filler in the finished polyurethane.

These polyurethane foams may be used, for example, as upholstery material in the motor vehicle and furniture manufacturing industry.

The dispersions are also suitable for the production of non-cellular polyurethane elastomers by any of the known processes. The prepolymer process being particularly preferred. The products obtained have excellent physical properties and are particularly distinguished from the known art products by their improved tensile strength and structural stability. The use of these dispersions for the production of polyurethanes thus results in products which have improved properties compared with the products known in the art. One major advantage of the dispersions of the instant invention lies in the fact that they can be produced reversibly. That is, if a faulty batch has been produced or if sedimentation occurs due to external circumstances (e.g. excessive temperature increase), the sedimented suspension is reversibly redispersible. This redispersion can be repeated several times without deleteriously affecting the properties of the polyurethanes produced from the dispersion.

The following Examples serve to illustrate the process of the invention without restricting it in any way. In the Examples, all quantities quoted represent parts by weight or percent by weight, unless otherwise indicated.

EXAMPLES

EXAMPLE 1

(a) Preparation of the Dispersion 150 g of a polyhexamethylene terephthalate having an average molecular weight of 675 (m.p. 120° C.) and 1350 g of a trifunctional polyether of propylene oxide and ethylene oxide (molecular weight 3,000) were heated to 165° C. under a nitrogen atmosphere. When the polyester had been melted, the mixture was cooled to room temperature with vigorous stirring. A finely divided dispersion having a hydroxyl number of 47.2 was obtained (average particle size: $0.8\mu$; 75% in the range of 0.1 to $1.2\mu$).

(b) Preparation of a Polyurethane Foam 89 g of the dispersion of Example 1(a) are stirred vigorously together with 4.8 g of water, 2.5 g of a 30% solution of endoethylene piperazine in diethylene glycol, 0.5 g of bis-(dimethylaminopropyl)-formamide and 1.5 g of a commercial silicone foam stabilizer. 82 g of a commonly available commercial polyisocyanate based on 4,4'-diisocyanatodiphenylmethane are then added. The reaction mixture is thoroughly stirred and foamed in an open mold. The resulting foam has the following physical properties:

| | |
|---|---|
| Gross density | 31 kg/m$^3$ (DIN 53 577) |
| Tensile strength | 180 KPa (DIN 53 571) |
| Elongation | 67% (DIN 53 571) |
| Compressive stress (DIN 53 577) | |
| at 10% deformation | 3.9 KPa |
| at 20% deformation | 5.1 KPa |
| at 30% deformation | 6.8 KPa |
| at 40% deformation | 9.5 KPa |

(c) Comparison Experiment

A foam prepared under the same conditions (see isocyanate index) and from the same starting components but without the dispersed polyhexamethylene terephthalate has the following physical properties:

| | |
|---|---|
| Gross density | 35 kg/m³ (DIN 53 577) |
| Tensile strength | 101 KPa (DIN 53 571) |
| Elongation | 120% (DIN 53 571) |
| Compressive strength (DIN 53 577) | |
| at 10% deformation | 2.3 KPa |
| at 20% deformation | 2.7 KPa |
| at 30% deformation | 3.1 KPa |
| at 40% deformation | 3.8 KPa |

EXAMPLE 2

A procedure similar to that described in Example 1 but using a polyhexamethylene terephthalate having an average molecular weight of 675 in which the hydroxyl end groups were blocked with stearyl isocyanate (m.p. 108° C.) was followed. The foam obtained had the following properties:

| | |
|---|---|
| Gross density | 34 kg/m³ (DIN 53 577) |
| Tensile strength | 114 KPa (DIN 53 571) |
| Elongation | 85% (DIN 53 571) |
| Compressive strength (DIN 53 577) | |
| at 10% deformation | 2.4 KPa |
| at 20% deformation | 3.2 KPa |
| at 30% deformation | 4.2 KPa |
| at 40% deformation | 5.7 KPa |

EXAMPLE 3

A procedure similar to Example 1 was followed with the following changes. There was used a dispersion containing as the disperse phase 13% by weight of a polyhexamethylene terephthalate with a molecular weight of 672 (m.p. 120° C.) and 6.5% by weight of a styrene/acrylonitrile copolymer. The foam obtained had the following properties:

| | |
|---|---|
| Gross density | 32 kg/m³ (DIN 53 577) |
| Tensile strength | 185 KPa (DIN 53 571) |
| Elongation | 55% (DIN 53 571) |
| Compressive stress (DIN 53 577) | |
| at 10% deformation | 4.6 KPa |
| at 20% deformatiom | 6.3 KPa |
| at 30% deformation | 8.6 KPa |
| at 40% deformation | 12.1 KPa |

EXAMPLE 4

A procedure similar to that of Example 1 where polybutylene terephthalate, having an average molecular weight of 1030 (melting point 198° C.) is used in place of the polyhexamethylene terephthalate of Example 1. The resulting foam had the following properties:

| | |
|---|---|
| Gross density | 33kg/m³ (DIN 53 577) |
| Tensile strength | 195 KPa (DIN 53 571) |
| Elongation | 60% (DIN 53 571) |
| Compressive strength (DIN 53 577) | |
| at 10% deformation | 4.8 KPa |
| at 20% deformation | 6.8 KPa |
| at 30% deformation | 9.3 KPa |
| at 40% deformation | 13.3 KPa |

EXAMPLE 5

A procedure similar to that of Example 1 where polyhexamethylene terephthalate, having an average molecular weight of 2490 (melting point 137° C.) is used in place of the polyhexamethylene terephthalate of Example 1. The resulting foam had the following properties:

| | |
|---|---|
| Gross density | 32 kg/m³ (DIN 53 577) |
| Tensile strength | 197 KPa (DIN 53 571) |
| Elongation | 55% (DIN 53 571) |
| Compressive strength (DIN 53 577) | |
| at 10% deformation | 4.3 KPa |
| at 20% deformation | 5.8 KPa |
| at 30% deformation | 7.6 KPa |
| at 40% deformation | 10.8 KPa |

EXAMPLE 6

(a) Preparation of the Dispersion

Using 135 g of the polytetramethylene terephthalate with an average molecular weight of 650 (melting point 176° C.) and 1190 g of a polypropylene glycol with an average molecular weight of 1000, a dispersion is prepared analogously to Example 1(a) by heating to 195° C. and cooling with stirring (particle size: 75% in the range of 0.1 to 1.4 $\mu$m).

(b) Preparation of a Polyurethane Elastomer 132 g of the above dispersion are mixed with 47 g of tolylene diisocyanate (80% 2,4- and 20% 2,6-isomer) at 130° C. After cooling to 120° C., the mixture is stirred under a nitrogen atmosphere for 30 minutes. 27.7 g of 3,5-diamino-4-chlorobenzoic acid isobutyl ester are then added, the mixture is stirred for 20 seconds and the reaction mixture is poured out on a plate preheated to 90° C. and is left to harden for 24 hours at 90° C. The resulting elastomer has the following properties:

| | | |
|---|---|---|
| $\sigma$100 | 11.2 MPa | (DIN 53 504) |
| Tensile strength | 21.3 MPa | (DIN 53 504) |
| Structural stability | 617 N | (DIN 53 504) |
| Hardness | 95 ShA | (DIN 53 505) |

An analogous elastomer prepared from the unmodified polyether has the following properties:

| | | |
|---|---|---|
| $\sigma$100 | 6.7 MPa | (DIN 53 504) |
| Tensile strength | 9.5 MPa | (DIN 53 504) |
| Structural stability | 285 N | (DIN 53 504) |
| Hardness (Shore A) | 85 | (DIN 53 505) |

EXAMPLE 7

(a) Preparation of a Dispersion

A dispersion having an average particle size of 0.8$\mu$ is prepared by the general method of Example 1(a) from 75 parts of a copolyether of propylene oxide and ethylene oxide (hydroxyl number 45) started on trimethylol propane, 20 parts of a copolyether of propylene oxide and ethylene oxide (hydroxyl number 35) started on trimethylolpropane and 5 parts of a polyhexamethylene terephthalate having an average molecular weight of 849 (melting point 125° C.).

(b) Preparation of a Flexible Polyurethane Foam 100 parts of the above dispersion are vigorously mixed with 48.1 parts of diisocyanatotoluene (2,4-/2,6-isomer ratio 72:28), 1.0 part of a commercial silicone stabilizer (OS 15 of Bayer AG), 0.25 part of a 3% solution of diazabicyclooctane in dipropylene glycol, 0.15 part of tin(II) octoate and 3.8 parts of water.

The rise time of the reaction mixture is 83 seconds, the gel time 90 seconds. The foam obtained is open-celled and free from flaws. It has the following mechanical properties:

| | |
|---|---|
| Gross density | 30 kg/m$^3$ |
| Tensile strength | 158 KPa |
| Elongation at break | 194% |
| Compression resistance at 40% | 5.65 KPa |
| Pressure deformation residue at 90% | 9.2% |

After the Ford test, the compression resistance was still 4.52 KPa and the pressure deformation residue 10.3%.

EXAMPLE 8

100 parts of the dispersion from Example 7(a) were vigorously mixed with 31.4 parts of diisocyanatotoluene (2,4-/2,6-isomer ratio 72:28), 1.0 part of a commercial silicone stabilizer (OS 15 Bayer AG), 0.15 part of a 3% solution of diazabicyclooctane in dipropylene glycol, 0.4 part of dimethylethanolamine, 0.1 part of tin(II) octoate and 2.2 parts of water.

The rise time of the reaction mixture is 125 seconds, the gel time 80 seconds. The open-celled, flawless foam obtained was found to have the following mechanical properties:

| | |
|---|---|
| Gross density | 48.5 kg/m$^3$ |
| Tensile strength | 209 KPa |
| Elongation at break | 262% |
| Compression resistance at 40% | 6.95 KPa |
| Pressure deformation residue at 90% | 5.7% |

After the Ford test, the compression resistance of 40% was still 5.56 KPa and the pressure deformation residue at 90%, 6.8%.

EXAMPLE 9

(a) Preparation of the Dispersion

A dispersion was prepared analogously to Example 1(a) by heating to 185° C. and cooling (with stirring), using 200 g of a copolyether ester which had been prepared according to German Offenlegungsschrift No. 2,706,297 by the reaction of 1,4-butanediol, dimethylterephthalate and polytetrahydrofuran (molecular weight 1000) and contained polyether and terephthalate sequences in proportions by weight of about 1:1 and had an average molecular weight of 7100 and a melting point of 160° C., and 1300 g of a trifunctional polyether of propylene oxide and ethylene oxide (molecular weight 3000). (Particle size of dispersion: 75% in the range of 0.1 to 1.6μ).

(b) Preparation of a Foam

The procedure is similar to that of Example 1(b). The foam obtained has the following properties:

| | |
|---|---|
| Gross density | 33 kg/m$^3$ (DIN 53 577) |
| Tensile strength | 161 KPa (DIN 53 571) |
| Elongation | 95% (DIN 53 571) |
| Compression stress (at 40% deformation) | 6.7 KPa (DIN 53 577) |

EXAMPLE 10

The procedure is the same as in Example 9 but the phase dispersed in the polyol component is a copolyether ester built up of butylene terephthalate and polypropylene oxide sequences having a molecular weight of 1000 (proportions by weight 55:45). This copolyether ester has an average molecular weight of 8500 and a melting point of 170° C.

The foam obtained had the following properties:

| | |
|---|---|
| Gross density | 32 kg/m$^3$ (DIN 53 577) |
| Tensile strength | 155 KPa (DIN 53 571) |
| Elongation | 88% (DIN 53 571) |
| Compressive stress (at 40% deformation) | 6.3 KPa (DIN 53 577) |

EXAMPLE 11

Preparation of a Heat Deformable Polyurethane Foam

Heat deformable foams are required to be readily deformed in the heated state (about 180° to 200° C.) so that details of the mold in which they are contained are accurately reproduced but at the same time the finished molded article should have a high heat distortion temperature. As the following experiments demonstrate, the use of the polyester dispersions according to the invention in conventional formulations of heat deformable polyurethane foams results in a substantial increase in the stability of contour of the finished molded part.

(a) Comparison Experiment 100 parts by weight of an addition product of propylene oxide and trimethylolpropane (hydroxyl number: 550), 1.5 parts of sodium castor oil sulphonate, 1.5 parts of water, 2 parts of dimethylcyclohexylamine, 15 parts of trichloromonofluoromethane and 202 parts of a prepolymer of a commercial polymethylene polyphenylene isocyanate having a diphenylmethane diisocyanate content of 90% and a mixture of tri- and tetrapropylene glycol (hydroxyl number 500) in which the isocyanate content of the prepolymer is 25% are vigorously mixed together and the reaction mixture is left to foam up in an open mold.

The resulting foam has a gross density of ca. 50 kg/m$^3$. For further processing, it is cut up into slabs 20 mm in thickness which are heated between contact heating plates at a temperature of 190° C. for 4 minutes and then rapidly transferred to an embossing mold. This mold is closed under pressure (about 8 bar) and the foam is stretched and compressed according to the contours of the mold.

To test the stability of contour, the finished molded part is kept in a heating channel for one hour, 24 hours after its production. The temperature at which changes in the contour of the molded part just fail to be observed is taken as the limiting temperature up to which the molded part has stability of contour. The molded foams obtained from the formulation indicated above are found to have a limiting temperature of 90° C.

(b) Process According to the Invention

When Experiment (a) is repeated but the polyol component used consists of 107 parts of a dispersion of 7 parts of polyhexamethylene terephthalate (melting point 120° C.) in 100 parts of the propoxylated trimethylolpropane prepared by a method similar to that of Example 1, the molded foam obtained from an otherwise identical formulation has a limiting temperature of contour stability of 110° C.

What is claimed is:

1. A dispersion comprising
(a) 1 to 40% by weight based on the whole dispersion of a polyester, polyester amide or segmented copolyether ester having a melting point above 100° C., as the disperse phase; in
(b) 99 to 60% by weight based on the whole dispersion of a polyhydroxyl compound having a melting point below 50° C. and a molecular weight of from 62 to 12,000 and in which said disperse phase is substantially insoluble, as the continuous phase;
said disperse phase further characterized as containing more than 50% by weight of dispersed particles in a size range of from 0.05 to 10μ.

2. A dispersion as claimed in claim 1, wherein said disperse phase contains more than 50% by weight, preferably more than 75% by weight, of the dispersed particles having a size of from 0.5 to 4.0μ.

3. A dispersion as claimed in claim 1, wherein said disperse phase contains more than 50% by weight, preferably more than 75% by weight, of the dispersed particles having a size of from 0.2 to 2.0μ.

4. A dispersion as claimed in claim 1, wherein component (a) has a melting point range of from 110° C. to 280° C. and a molecular weight range of from 254 to 50,000.

5. A dispersion as claimed in claim 1, wherein component (a) is a polyester polyol having 2 to 4 hydroxyl groups, all or part of said hydroxyl groups optionally blocked with isocyanates or carboxylic acid anhydrides.

6. A dispersion as claimed in claim 1, wherein component (a) is a polyester of terephthalic acid and 1,4-butanediol and/or hexanediol and/or ethylene glycol.

7. A dispersion as claimed in claim 1, wherein component (b) has a melting point below 20° C.

8. A dispersion as claimed in claim 1, wherein component (b) is a polyether polyol having 2 to 8 hydroxyl groups and having a molecular weight of from 400 to 10,000.

9. A dispersion as claimed in claim 1, wherein component (b) is a polyether polyol having 2 to 4, preferably 2, hydroxyl groups and having a molecular weight of from 400 to 6,000.

10. A process for preparing dispersions comprising:
(i) vigorously mixing
(a) 1 to 40% by weight, based on the whole dispersion, of a polyester, polyester amide or segmented copolyether ester having a melting point above 100° C., as the disperse phase; and
(b) 99 to 60% by weight, based on the whole dispersion, of a polyhydroxyl compound having a melting point below 50° C. and a molecular weight of from 62 to 12,000 and in which said disperse phase is substantially insoluble, as the continuous phase;
together at a temperature above the melting point of component (a);
(ii) simultaneously subjecting said components (a) and (b) to high shearing forces; and
(iii) lowering the temperature below the melting point of said component (a) while continuing said vigorous stirring.

11. A process for the preparation of dispersions comprising:
(i) dissolving
(a) 1 to 40% by weight, based on the whole dispersion, of a polyester, polyester amide or segmented copolyether ester having a melting point above 100° C. as the disperse phase;
in a solvent with vigorous stirring;
(ii) mixing, optionally portionwise, dissolved component (a) with
(b) 99 to 60% by weight, based on the whole dispersion, of a polyhydroxyl compound having a melting point below 50° C. and a molecular weight of from 62 to 12,000 and in which said disperse phase is substantially insoluble, as the continuous phase;
optionally dissolved in solvent, with vigorous stirring; and
(iii) distilling off said solvents either during step (ii) or after completing step (ii), optionally under vacuum.

12. A process for the preparation of cellular or non-cellular polyurethanes by reacting
(i) polyisocyanates;
(ii) relatively high molecular weight polyhydroxyl compounds containing organic fillers; and optionally
(iii) other compounds having isocyanate reactive groups; optionally in the presence of
(iv) blowing agents, activators and other known additives;
the improvement comprising using as component (ii) dispersions comprising:
(a) 1 to 40% by weight based on the whole dispersion of a polyester, polyester amide or segmented copolyether ester having a melting point above 100° C., as the disperse phase; in
(b) 99 to 60% by weight, based on the whole dispersion, of a polyhydroxyl compound having a melting point below 50° C. and a molecular weight of from 62 to 12,000 and in which said disperse phase is substantially insoluble as the continuous phase; said disperse phase further characterized as containing more than 50% by weight of dispersed particles in a size range of from 0.05 to 10μ,
characterized in that the temperature of the reaction mixture of components (i), (ii) and (iii) is maintained below the melting point of said organic filler dispersed in component (ii).

13. A dispersion as claimed in claim 1, wherein component (a) has a melting point range of from 120° to 220° C. and a molecular weight range of from 300 to 25,000.

* * * * *